United States Patent
Guynes et al.

(10) Patent No.: US 11,199,915 B2
(45) Date of Patent: Dec. 14, 2021

(54) MONITOR WITH SLIDABLE TOUCHPAD

(71) Applicant: HEWLETT-PACKARD DEVELOPMENT COMPANY, L.P., Houston, TX (US)

(72) Inventors: Timothy P. Guynes, Houston, TX (US); John W. Frederick, Houston, TX (US); Syed S. Azam, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 707 days.

(21) Appl. No.: 16/074,269

(22) PCT Filed: Sep. 22, 2016

(86) PCT No.: PCT/US2016/053016
§ 371 (c)(1),
(2) Date: Jul. 31, 2018

(87) PCT Pub. No.: WO2018/056974
PCT Pub. Date: Mar. 29, 2018

(65) Prior Publication Data
US 2021/0181868 A1    Jun. 17, 2021

(51) Int. Cl.
| | | |
|---|---|---|
| *G06F 3/0354* | (2013.01) |
| *G06F 3/038* | (2013.01) |
| *G06F 3/0481* | (2013.01) |
| *G06F 1/16* | (2006.01) |
| *G06F 3/0482* | (2013.01) |

(52) U.S. Cl.
CPC ........ *G06F 3/03547* (2013.01); *G06F 1/1607* (2013.01); *G06F 3/038* (2013.01); *G06F 3/04817* (2013.01); *G06F 3/0482* (2013.01); *G06F 2203/0384* (2013.01)

(58) Field of Classification Search
CPC .... G06F 3/03547; G06F 1/1607; G06F 3/023; G06F 3/14; G06F 3/03543; G06F 3/04817; G06F 3/038; G06F 3/0482; G06F 2203/0384; G06F 3/0489; G06F 3/04897; G06F 3/0227; G06F 2200/1612; G06F 1/1601
See application file for complete search history.

(56) References Cited

U.S. PATENT DOCUMENTS

| | | | |
|---|---|---|---|
| 5,490,039 A | 2/1996 | Helms | |
| 7,382,355 B2* | 6/2008 | Hermann | H04M 1/0231 345/168 |
| 7,656,386 B1 | 2/2010 | Goldbaum | |
| 8,035,653 B2 | 10/2011 | Tsai | |

(Continued)

OTHER PUBLICATIONS

Baker, "Dell U2715H", Retrieved from Internet: http://www.tftcentral.co.uk/reviews/dell_u2715h.htm, Jan. 15, 2015, 1 Page.

(Continued)

*Primary Examiner* — Vijay Shankar
(74) *Attorney, Agent, or Firm* — Fabian VanCott

(57) ABSTRACT

A monitor includes: a circuit board; a display device controlled by the circuit board; and a touchpad to receive user input for the circuit board. The touchpad is slidable between a retracted position inside the monitor and an extended position where user input can be entered to the touchpad.

20 Claims, 11 Drawing Sheets

(56) References Cited

U.S. PATENT DOCUMENTS

| | | |
|---|---|---|
| 8,365,085 B2 | 1/2013 | Kim |
| 8,587,724 B2 | 11/2013 | Kang et al. |
| 9,030,497 B2 | 5/2015 | Abe |
| 10,712,896 B2 * | 7/2020 | Lee .................. H04N 21/47 |
| 2006/0202963 A1 | 9/2006 | Hermann |
| 2006/0244863 A1 | 11/2006 | Baikie et al. |
| 2016/0014367 A1 | 1/2016 | Yeo et al. |
| 2016/0188156 A1 | 6/2016 | Lee et al. |

OTHER PUBLICATIONS

Raphael, "Motorola's Droid 2 vs. the Original Droid", Retrieved from Internet: https://www.pcworld.com/article/203022/Motorolas_Droid_2_vs_the_Original_Droid.html, Aug. 10, 2010, 3 Pages.

"Form Factor (Mobile Phones)", Retrieved from Internet: https://en.wikipedia.org/wiki/Form_factor_(mobile_phones), 2016, 5 Pages.

* cited by examiner

MONITOR WITH SLIDABLE TOUCHPAD

BACKGROUND

Monitors are frequently used with a computer or other electronic equipment to provide a larger or higher quality display space than is available on the connected device itself. The device connected to the monitor is referred to as the host and can then use the monitor to display images or video or output audio for the user. The connection between the host and the monitor may be wired or wireless.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
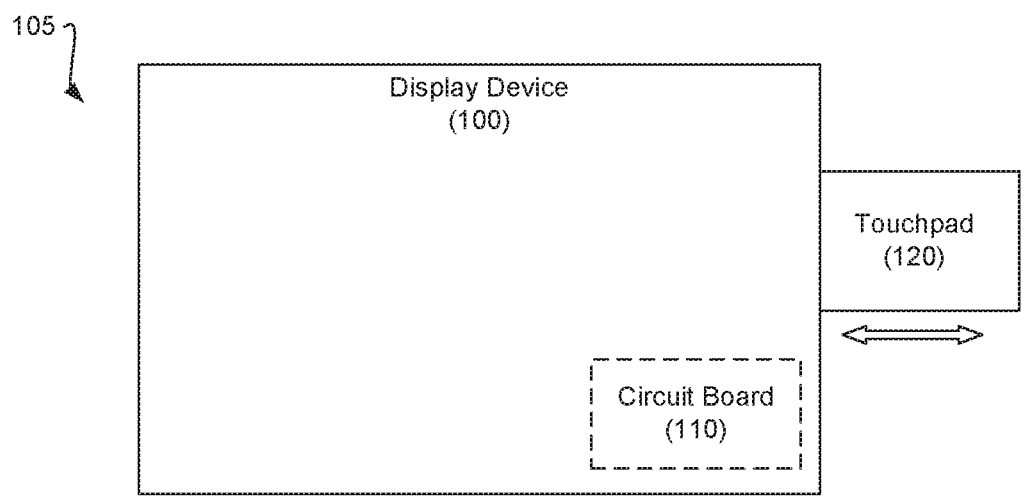
FIG. 1 is a block diagram of an example monitor consistent with the disclosed implementations.

As noted above, monitors are frequently used with a computer or other electronic equipment to provide a larger or higher quality display space than is available on the connected device itself. The device connected to the monitor is referred to as the host and can be a desktop computer, tablet computer, laptop computer, smartphone or other electronic device. The host may be connected to the monitor wirelessly or through a cable and can then use the monitor to display images or video or output audio for the user. The host device may include or may communicate with input devices (e.g., a keyboard, a mouse, a touchpad, etc.), that allow the user to interact with the displayed images or video.

As used herein, the term "monitor" refers collectively to a number of components that make up the monitor. Specifically, the monitor will include a display device which is the component on which images are displayed. The display device may be supported or surrounded by a housing. A front portion of the housing that frames the display device, as the display device is viewed from the front of the monitor or as presented for a user to view images thereon, is referred to as a "bezel." To improve the size and appearance of the display device and its display, efforts have been made to minimize the size of the bezel as much as possible. As used herein and in the appended claims, the term "monitor" refers exclusively to a separate, peripheral device for use with a separate host device. The term "monitor" does not refer to a display device that is incorporated into a host device.

In some examples, the monitor may also include speakers to output audio from the host. This audio may be associated with images or video being displayed or may be a separate audio feed.

Additionally, the monitor may include a user interface to allow the user to control aspects of the monitors operation. For example, there may be a number of different inputs to the monitor where different hosts can be connected. Some hosts may use a different type of connection to the monitor than other hosts. Consequently, the monitor may be controlled to select which one of a number of different available inputs should be active so that the user can operate the monitor with a desired host. The user may also want to adjust the resolution, brightness, contrast, color and other parameters of the monitor's operation.

In some examples, this user interface includes an On-Screen Display (OSD) and a number of physical buttons located on the bezel of the monitor that are used to provide input based on what is displayed in the OSD. The OSD is an image or text that the monitor displays, which may replace or be superimposed over an image from the host device. Alternatively, the monitor may display the OSD even without any input from a host device. In such a user interface, the monitor may display in the OSD a menu of settings that the user can adjust to control the operation of the monitor. The user can navigate this menu and make selections to choose and adjust settings by operating the physical buttons on the bezel in conjunction with the displayed menu of the OSD.

However, minimizing or even eliminating the bezel provides advantages, such as making the screen appear larger and making the monitor appear less bulky and heavy, among others. Removing the physical buttons from the bezel allows a much thinner bezel. However, to optimize the user experience, the buttons or user input for the OSD should be easily accessible. Consequently, the present specification describes, among other things, examples of monitors that do not employ physical buttons on a bezel as part of a user interface including an OSD.

In one example, the present specification describes a monitor that includes: a circuit board; a display device controlled by the circuit board; and a touchpad to receive user input for the circuit board. The touchpad is slidable between a retracted position inside the monitor and an extended position where user input can be entered to the touchpad.

In another example, the present specification describes a method that includes: forming a monitor comprising a circuit board and a display device controlled by the circuit board; and coupling, to the monitor, a touchpad to receive user input, the touchpad being slidable between a retracted position in a pocket inside the monitor and an extended position where user input can be entered to the touchpad and communicated to the circuit board.

In another example, the present specification describes a monitor that includes: a circuit board; a display device controlled by the circuit board; a bezel around the display device; and a touchpad to receive user input, the touchpad being slidable between a retracted position at least partially inside a pocket in the bezel and an extended position where a surface of the touchpad is exposed so that user input can be entered to the touchpad. The circuit board is to selectively display an on-screen display (OSD) on the display device and accept user input, in connection with the OSD, from the touchpad.

As used herein and in the following claims, the term "monitor" refers to a collection of components including, at least, a display device and, a circuit board controlling the display device.

As used herein and in the following claims, the term "display device" refers to a component of a monitor that is driven by logic, such as a circuit board, to display images or video to a user.

As used herein and in the following claims, the term "touchpad" refers to a touch-sensitive pad that respond to a user's touch as part of a user interface. The touchpad may detect various forms of a user's touch, such as a touch, tap or sliding of a user's finger, on the touchpad. These different types of contact with the touchpad may correspond to different desired inputs.

FIG. 1 is a block diagram of an example monitor consistent with the disclosed implementations. As shown in FIG. 1, the example monitor (105) includes: a circuit board (110); a display device (100) controlled by the circuit board (110); and a touchpad (120) to receive user input for the circuit board.

The touchpad (120) is slidable between a retracted position inside the monitor and an extended position where user input can be entered to the touchpad. For example, rails, tracks or slots in the housing of the monitor may cooperate with corresponding, rollers, sliders or ridges on the touchpad (120) to allow the touchpad to move in and out between the retracted and extended positions. Stops may limit the extension of the touchpad (120) or, in some other examples, described below, the touchpad may be removable from the monitor housing.

In the monitor (105) of FIG. 1 there are not physical keys provided around the display device with which a user can respond to and control a displayed menu of an On-Screen Display. Rather, when the user would like to adjust the settings of the monitor (105), the touchpad (120) can be pulled or extended from a retracted position with respect to the display device (100).

In some examples, the act of extending the touchpad (120) will automatically signal the circuit board (110) to display an OSD, In other examples, the user may tap the touchpad (120) or give some other designated input to the touchpad (120) to invoke display of the OSD. The circuit board (110) may generate the content to be included in the OSD. For example, the circuit board (110) may include a processor and a computer-readable medium, digital or analog circuitry, or the like able to generate the content. The circuit board (110) may generate the content to be included in the OSD without using an operating system. As will be described in further detail below, the user may then use the touchpad (120) to control the OSD and adjust settings of the monitor (105). The touchpad (120) may transmit user selections to the circuit board (110), which may modify the content to be included in the OSD.

When the user is finished adjusting the settings of the monitor (105), the touchpad (120) can be slid back to its retracted position with respect to the display device (100). Moving the touchpad (120) to its retracted position may signal the circuit board (110) to discontinue display of the OSD. In some examples, the circuit board (110) may ignore input from the touchpad (120) when the touchpad (120) is in the retracted position and respond to input from the touchpad (120) when the touchpad (120) is in the extended position.

The touchpad (120) may be a rigid panel or may be flexible panel. A flexible touchpad could accommodate being retracted into a curved pocket to accommodate curvature of the bezel or display device. The touchpad (120) may also include a grip or grips to facilitate being extended and retracted by the user, as will be shown below. In various examples, the touchpad (120) may be extended manually, may be spring loaded to facilitate extension or may be extended and retracted by a motor controlled by the user.

In some examples, the touchpad (120) may also include status Light Emitting Diodes (LEDs). For example, the LEDs may indicate when the touchpad (120) is active for receiving user input or another status of the monitor or touchpad. The monitor handles input from a variety of hosts and produces the OSD. Consequently, the arrangement described, including the touchpad (120) is not dependent on any particular operating system.

Figure 2:
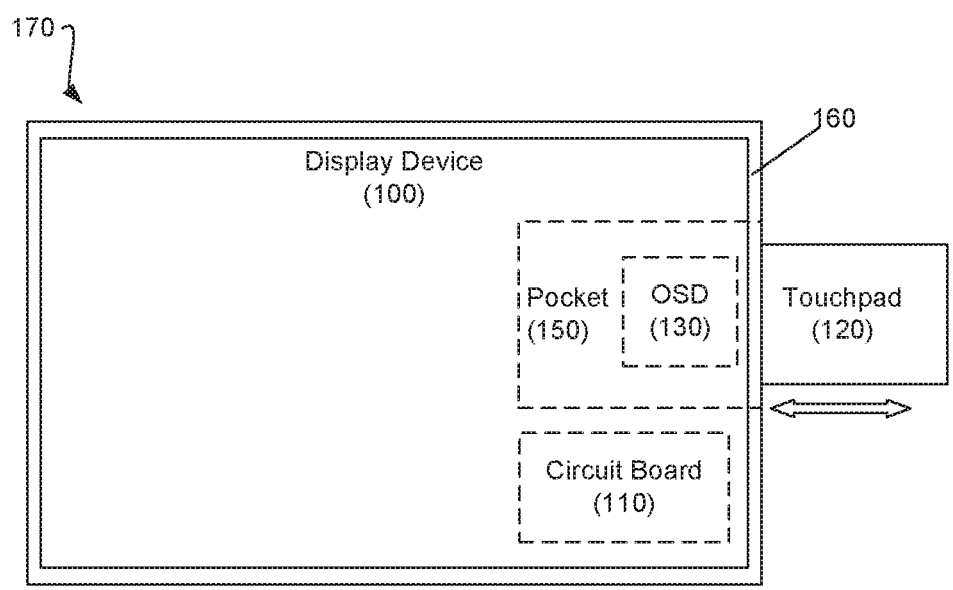
FIG. 2 is a block diagram of another example monitor consistent with the disclosed implementations.

FIG. 2 is a block diagram of another example monitor consistent with the disclosed implementations. As shown in FIG. 2, the illustrated monitor (170) includes: a circuit board (110); a display device (100) controlled by the circuit board; a bezel (160) around the display device (100); and a touchpad (120) to receive user input. As described above, the touchpad (120) is slidable between a retracted position and an extended position.

In the example of FIG. 2, a pocket (150) is provided in the monitor (170) with an opening in the bezel (160). Consequently, the touchpad (120) is slidable between a retracted position in which the touchpad is at least partially inside the pocket (150) in the bezel (160) and an extended position. In the illustrated example, in the extended position, an input surface of the touchpad (120) is exposed so that user input can be entered to the touchpad. However, other portions of the touchpad may serve as the input surface. The input surface may be partially exposed or entirely covered when the touchpad (120) is inside the pocket (150).

As described above, the circuit board (110) is to selectively display an on-screen display (OSD) (130) on the display device (100) and accept user input, in connection with the OSD, from the touchpad (120). Consequently, the OSD (130) may be displayed on the display device (100) adjacent to the touchpad (120). As described above, the OSD (130) may include a menu through which the user can navigate, select items and adjust settings of the monitor using the adjacent touchpad (120) as the user input device.

Internally, the connection between the touchpad (120) and the circuit board (110) may include a cable or flexible ribbon that allows for the movement of the touchpad (160). Alternatively, there may be contacts at the bezel (160) into which corresponding contacts on the touchpad come into contact when the touchpad is fully extended. These contacts may provide power and data connections between the monitor (170) and the touchpad (120), including communication with the circuit board (110).

Figure 3:
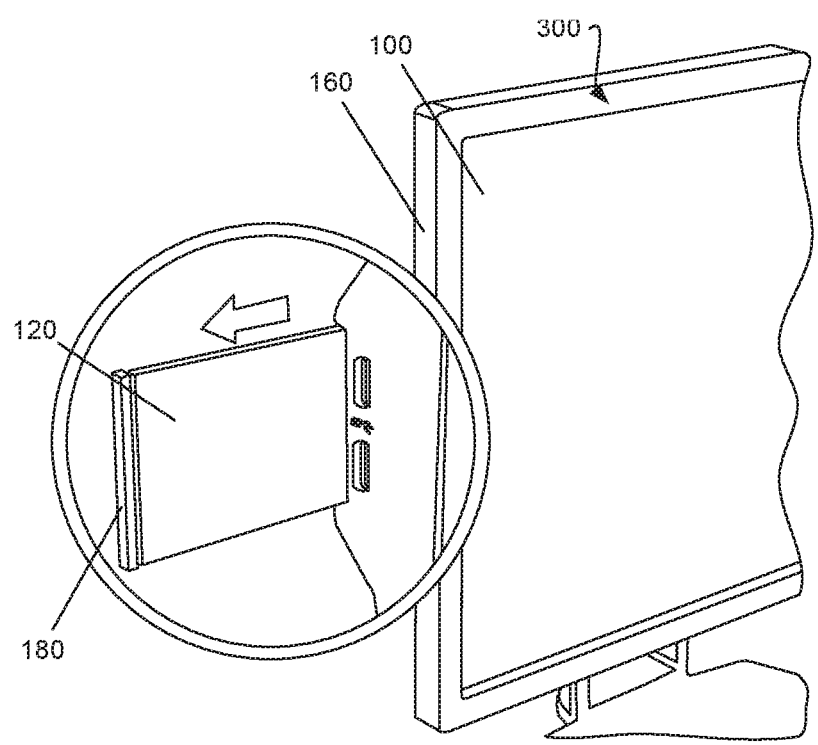
FIG. 3 is an illustration of another example monitor consistent with the disclosed implementations.

FIG. 3 is an illustration of another example monitor (300) consistent with the disclosed implementations. The portion of the illustration in the circle is magnified with respect to the scale of the rest of the illustration to better show the detail included therein.

As shown in FIG. 3, the touchpad (120) slides in and out of a pocket in the bezel (160). The majority of the space for the pocket within the monitor may be located behind the display device (100). As also shown in FIG. 3, the touchpad (120) may include a grip (180) to facilitate being grasped by the user for sliding the touchpad (120) in or out of the bezel (160). The grip (180) may include a material, such as rubber, with a high frictional coefficient. Additionally or alternatively, the grip (180) may include an enlarged portion of the touchpad or a portion of the touchpad ergonomically shaped to facility being grasped by a human hand. The grip may protrude from the bezel when the touchpad (120) is retracted to facilitate sliding of the touchpad (120).

Figure 4:
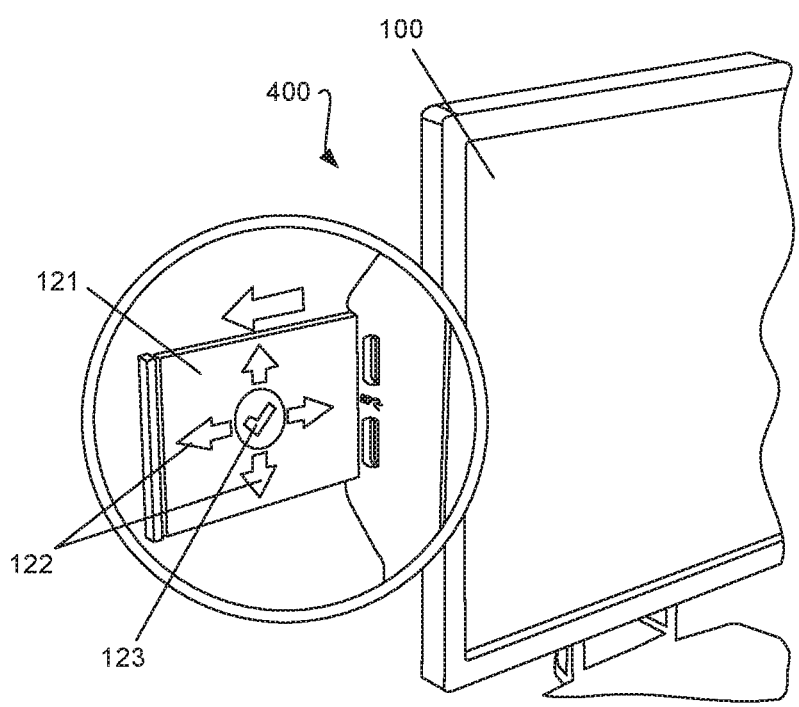
FIG. 4 is an illustration of another example monitor consistent with the disclosed implementations.

FIG. 4 is an illustration of another example monitor (400) consistent with the disclosed implementations. As shown in FIG. 4, the touchpad (121) may include icons to assist the user in operating the OSD of the display device (100).

As noted above, the OSD may include a menu that the user can navigate to control operation of the monitor. Consequently, the touchpad (121) may include navigational icons (122). These portions of the touchpad (121) can be touched or tapped to move a cursor on the menu of the OSD in the corresponding direction. A selection icon (123) may indicate where the touchpad (121) is to be touched or tapped to indicate selection of an item on the OSD.

In one example, the OSD may initially contain a menu with options including "select input," "volume control" and "adjust picture," The user may then navigate among these options by tapping the appropriate navigational icons (122) on the touchpad (121). When the desired option is highlighted or otherwise indicated, the user can select that option with the selection icon (123).

The OSD may then open a corresponding sublevel of the menu or the desired setting controls. For example, if the user selects "select input," the OSD may then display a list of all the available inputs to the monitor, such as a number of HDMI or other ports. The user again navigates to the desired option using the navigational icons (122) on the touchpad (121) and selects the desired option with the selection icon (123). The monitor then uses the indicated input as its connection to a host device.

Continuing this example, if the user selects "volume control" from the initial menu, the OSD may then display an indication of the current volume level, graphically or numerically, and indicate that the up and down navigational icons (122) can then be used to raise or lower the volume of audio output by the monitor.

In one example, the icons (122, 123) can be silk screen printed on the surface of the touchpad (121). However, other methods of applying the icons to the touchpad may be used. Additionally, any number, type or style of icons may be placed on the touchpad to facilitate the user's operation of the OSD and manipulation of the monitor's settings.

Figure 5:
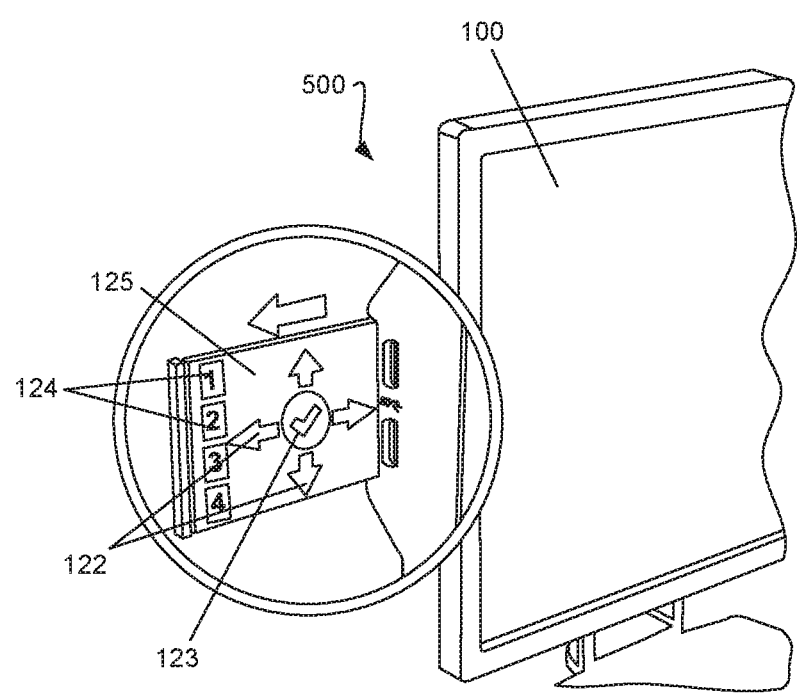
FIG. 5 is an illustration of another example monitor consistent with the disclosed implementations.

FIG. 5 is an illustration of another example monitor (500) consistent with the disclosed implementations. As shown in FIG. 5, the icons on the touchpad (125) may include several numeric icons (124). These keys may be used to more quickly select an option from a menu of the OSD. For example, if four or fewer options are shown in a menu of the OSD, rather than navigating among the options, the user may simply touch or tap the numeric icon (124) corresponding to the desired menu option. In some examples, there may be more or fewer than four numeric icons. The icons may include symbols other than numbers, e.g., alphabetic characters, or no symbols.

Figure 6:
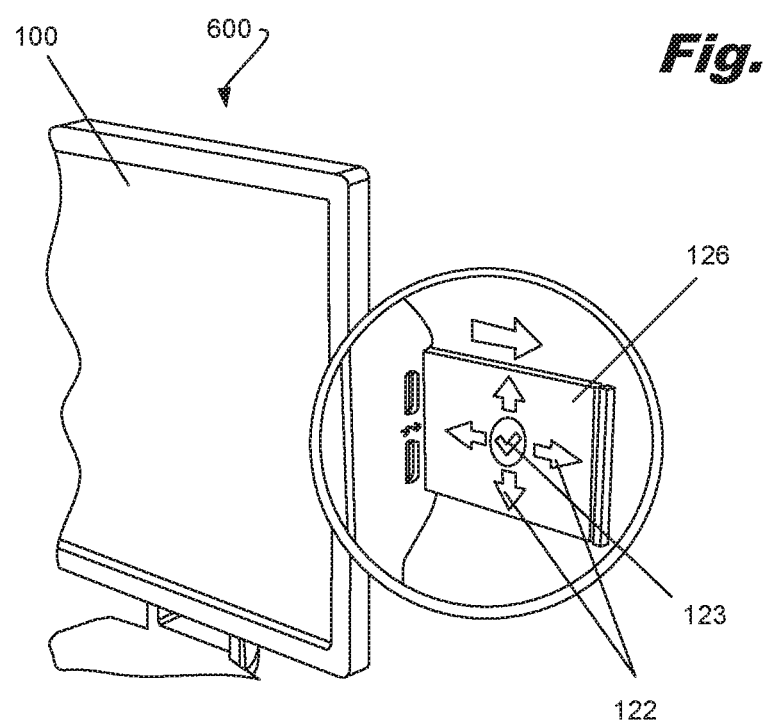
FIG. 6 is an illustration of another example monitor consistent with the disclosed implementations.

FIG. 6 is an illustration of another example monitor (600) consistent with the disclosed implementations. As shown in FIG. 6, the touchpad (126) may extend from the right side of the monitor (600), as opposed to the left side as shown in FIGS. 3-5. The touchpad may be extended and retracted from any portion of the monitor, for example, from either side, from the bottom or from the top of the monitor.

Figure 7:
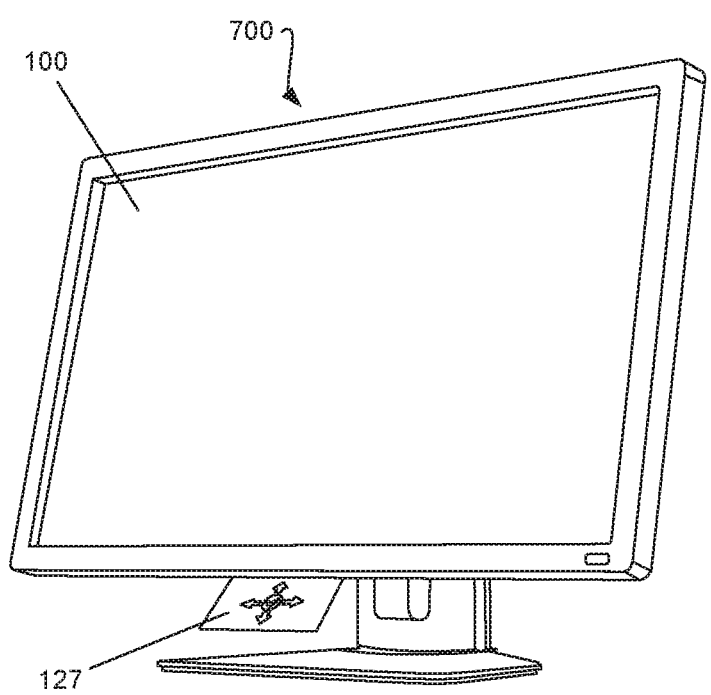
FIG. 7 is an illustration of another example monitor consistent with the disclosed implementations.

FIG. 7 is an illustration of another example monitor (700) consistent with the disclosed implementations. Specifically, FIG. 7 illustrates an example in which the touchpad (127) extends from, and is retractable into, the bottom edge of the monitor (700).

Figure 8:
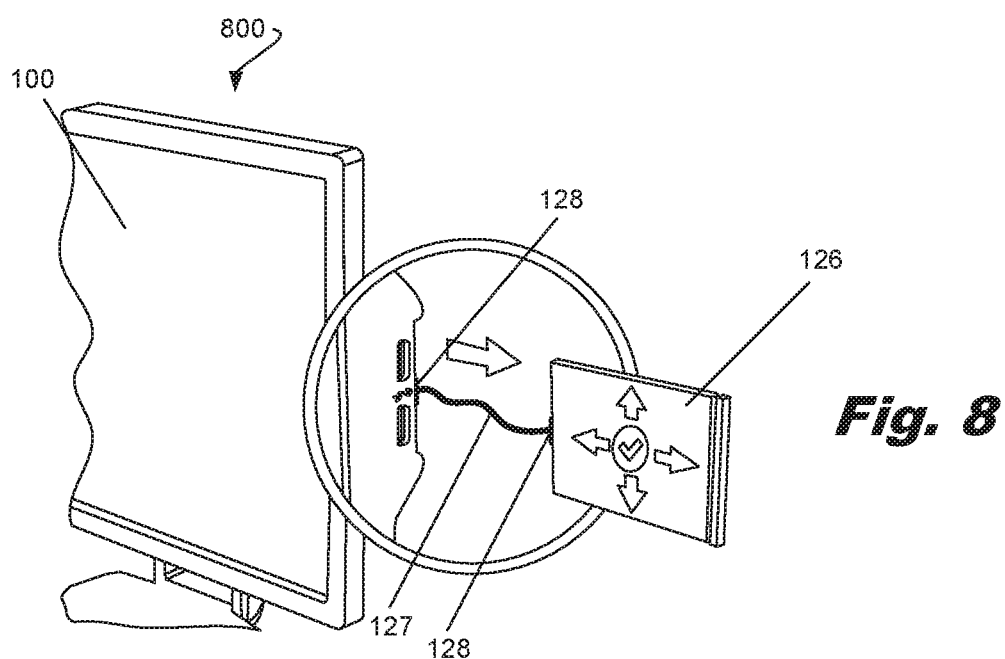
FIG. 8 is an illustration of another example monitor consistent with the disclosed implementations.

FIG. 8 is an illustration of another example monitor (800) consistent with the disclosed implementations. As shown in FIG. 8, the touchpad (126), after sliding out of the pocket in the bezel, may be completely removed from the monitor (800).

In the example of FIG. 8, the touchpad (126) is connected for communication to the monitor (800) by a cable (127). This cable may be, for example, a flexible ribbon cable or a Universal Serial Bus (USB) cable.

With the touchpad (126) completely removable from the monitor, the touchpad (126) could be placed on a desk or table surface near the monitor (800). In this way, the user can operate the touchpad (126) to control the OSS of the monitor with the touchpad (126) laying conveniently on a flat work surface near the monitor (800).

In the illustrated example, the monitor (800) includes a first USB port (128) for connection to the cable (127). The touchpad (126) likewise includes a second USB port (128) for connection to the cable (127). With these ports readily accessible, different lengths of USB cable (127) can be used as suits a user's needs and preferences. If the user desires more range for the touchpad (126), a longer USB cable can be readily installed.

Figure 9:
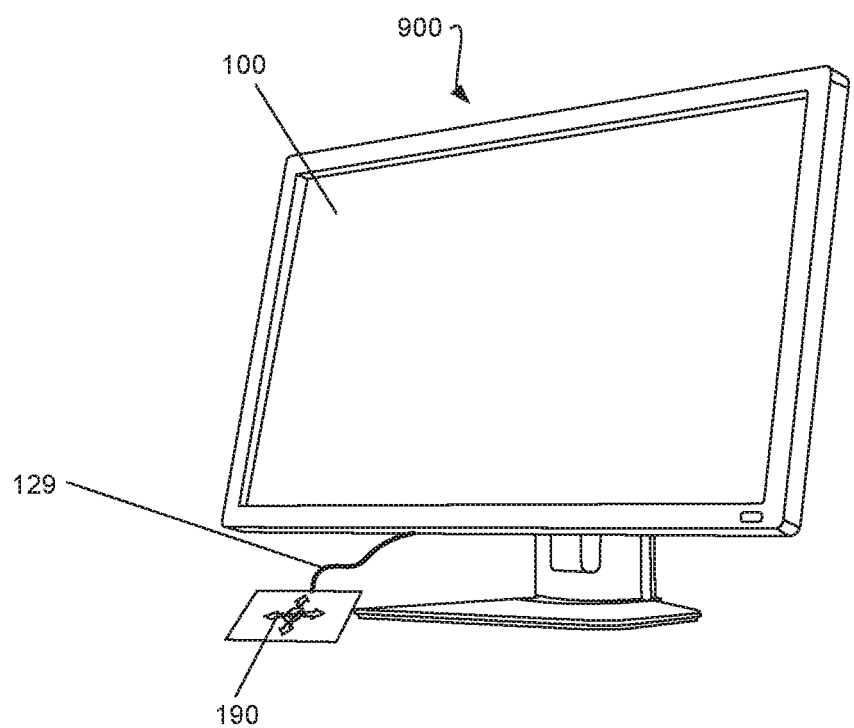
FIG. 9 is an illustration of another example monitor consistent with the disclosed implementations.

FIG. 9 is an illustration of another example monitor (900) consistent with the disclosed implementations. As shown in FIG. 9, the touchpad (190) that is connected by cable (129) to the monitor (900) can extend from the bottom of the monitor (900), rather than from a side as shown in FIG. 8.

Figure 10:
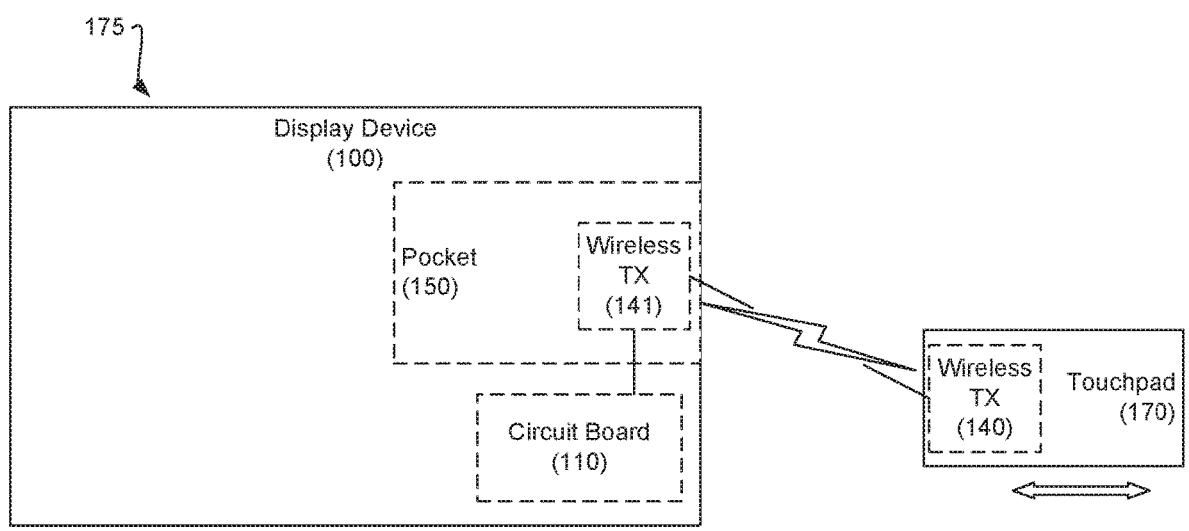
FIG. 10 is a block diagram of another example monitor consistent with the disclosed implementations.

FIG. 10 is a block diagram of another example monitor (175) consistent with the disclosed implementations. As shown in FIG. 10, the touchpad (170) is again completely removable from the pocket (150) of the monitor (175) for the convenience of the user. However, in this example, the touchpad (170) includes a wireless transceiver (140) to communicate with a corresponding wireless transceiver (141) in the monitor (175). These transceivers may be radio frequency, including WiFi or Bluetooth devices, or may be infrared optical devices.

Figure 11:
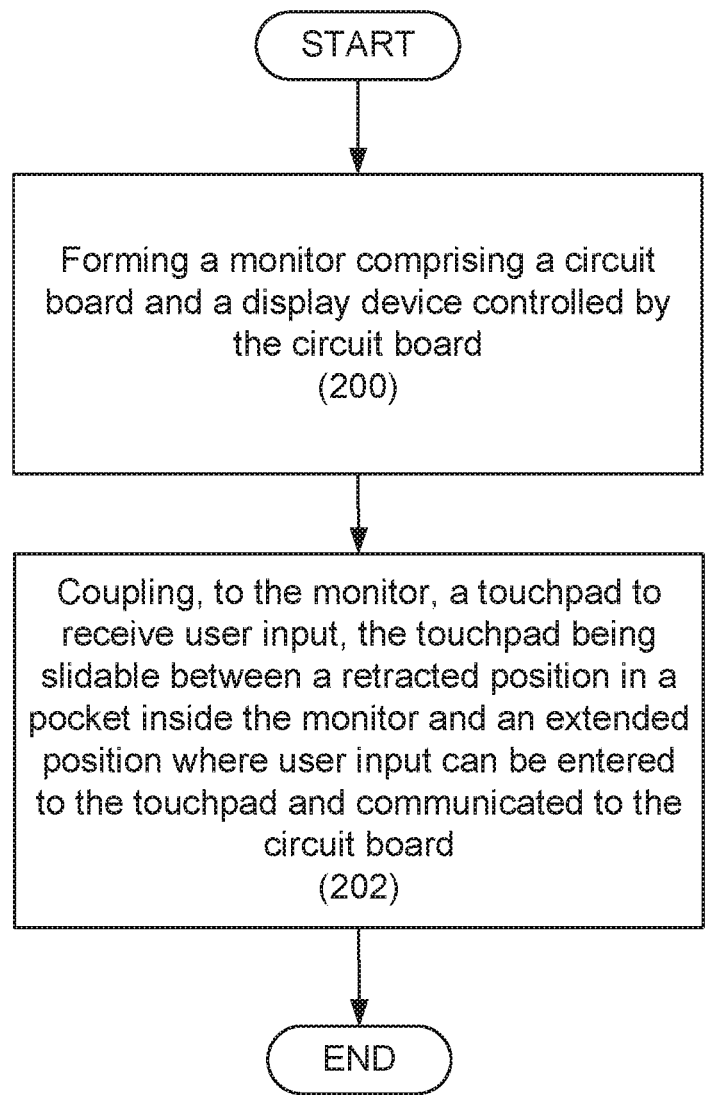
FIG. 11 is a flowchart of an example method consistent with the disclosed implementations.

FIG. 11 is a flowchart of an example method consistent with the disclosed implementations. As shown in FIG. 11, the illustrated method includes: forming (200) a monitor comprising a circuit board and a display device controlled by the circuit board; and coupling (202), to the monitor, a touchpad to receive user input, the touchpad being slidable between a retracted position in a pocket inside the monitor and an extended position where user input can be entered to the touchpad and communicated to the circuit board.

The preceding description has been presented only to illustrate and describe examples of the principles described. This description is not intended to be exhaustive or to limit these principles to any precise form disclosed. Many modifications and variations are possible in light of the above teaching.

What is claimed is:
1. A monitor comprising:
   a circuit board;
   a display device controlled by the circuit board;
   a bezel around the display device; and
   a touchpad to receive user input, the touchpad being slidable between a retracted position at least partially inside a pocket in the bezel and an extended position where a surface of the touchpad is exposed so that user input can be entered to the touchpad;

wherein the circuit board is to selectively display an on-screen display (OSD) on the display device and accept user input, in connection with the OSD, from the touchpad, wherein the OSD is generated by the circuit board of the monitor and includes controls for operating parameters of the monitor rather than input for any host device connected to the monitor.

2. The monitor of claim 1, wherein the touchpad comprises icons indicating portions of the touchpad to touch to make corresponding input to the OSD.

3. A method comprising:
forming a monitor comprising a circuit board and a display device controlled by the circuit board; and
coupling, to the monitor, a touchpad to receive user input, the touchpad being slidable between a flat retracted position in a pocket inside the monitor and an extended position where user input can be entered to the touchpad and communicated to the circuit board.

4. The method of claim 3, further comprising, with the circuit board, selectively displaying an on-screen display (OSD) on the display device and accepting user input, in connection with the OSD, from the touchpad, wherein the OSD is generated by the circuit board of the monitor and includes controls for operating parameters of the monitor rather than input for any host device connected to the monitor.

5. The method of claim 3, further comprising providing communication between the touchpad and the circuit board when the touchpad is removed entirely from the pocket.

6. A monitor comprising:
a circuit board;
a display device controlled by the circuit board; and
a touchpad to receive user input for the circuit board, the touchpad being slidable between a retracted position inside the monitor and an extended position where user input can be entered to the touchpad.

7. The monitor of claim 6, wherein the circuit board is to selectively display an on-screen display (OSD) on the display device and accept user input, in connection with the OSD, from the touchpad, wherein the OSD is generated by the circuit board of the monitor and includes controls for operating parameters of the monitor rather than input for any host device connected to the monitor.

8. The monitor of claim 7, wherein the touchpad comprises icons indicating portions of the touchpad to touch to make corresponding input to the OSD.

9. The monitor of claim 8, wherein the icons include navigation keys and a selection key.

10. The monitor of claim 8, wherein the icons include numbers to provide numeric input to the OSD.

11. The monitor of claim 6, wherein a pocket inside the monitor that accommodates the touchpad in the retracted position is curved, and the touchpad is flexible to accommodate curvature of the pocket when in the retracted position.

12. The monitor of claim 6, wherein the touchpad comprises a wireless transceiver to communicate wirelessly with a wireless transceiver connected to the circuit board.

13. The monitor of claim 12, wherein the touchpad is not attached to the monitor and can be separated from the monitor.

14. The monitor of claim 6, further comprising a cable providing communication between the touchpad and circuit board, the cable having a length that extends from a bezel of the monitor when the touchpad is separated from the monitor.

15. The monitor of claim 6, further comprising:
a Universal Serial Bus (USB) port of the monitor;
a second USB port on the touchpad; and
a USB cable connecting the touchpad to the monitor.

16. The monitor of claim 6, wherein extension of the touchpad sends a signal to the circuit board, in response to which, the circuit board displays an On-Screen Display of the monitor on the display device.

17. The monitor of claim 6, further comprising stops at an opening of pocket in the monitor where the touchpad resides when in the retracted position, the stops to prevent the touchpad being fully removed from the pocket.

18. The monitor of claim 6, further comprising contacts in a bezel of the monitor at an opening of pocket in the monitor where the touchpad resides when in the retracted position, wherein corresponding contracts on the touchpad make contact with the contacts in the bezel when the touchpad slides to the extended position, the contact between the contacts on the bezel and the touchpad allowing the touchpad to communicate with the circuit board.

19. The monitor of claim 6, wherein moving the touchpad to the retracted position signals the circuit board to discontinue an On-Screen Display of controls for the monitor.

20. The monitor of claim 6, further comprising a pocket in the monitor where the touchpad resides when in the retracted position, the pocket comprising rails or tracks on which the touchpad slides between the extended position and the retracted position.

* * * * *